(No Model.)

B. F. RIX.
GRAIN AND FERTILIZER DISTRIBUTER.

No. 361,781. Patented Apr. 26, 1887.

Witnesses.
John C. Perkins
Henry S. M. Howard

Inventor.
Benj. F. Rix
By Lucius C. West
Atty.

UNITED STATES PATENT OFFICE.

BENJAMIN F. RIX, OF KALAMAZOO, MICHIGAN.

GRAIN OR FERTILIZER DISTRIBUTER.

SPECIFICATION forming part of Letters Patent No. 361,781, dated April 26, 1887.

Application filed February 15, 1887. Serial No. 227,712. (No model.)

*To all whom it may concern:*

Be it known that I, BENJAMIN F. RIX, a citizen of the United States, residing at Kalamazoo, county of Kalamazoo, State of Michigan, have invented a new and useful Grain or Fertilizer Distributer, of which the following is a specification.

The main object of this invention is to construct a peculiar feed for distributing fertilizers and grain, the same consisting, essentially, of a revoluble cylinder mounted in a pocket for containing fertilizer or grain, said cylinder being provided at its periphery with wings having bearings, so as to be oscillated from a radial angle down to a plane with said periphery, and vice versa, substantially as below described and claimed, in which description the operation and means of producing it are also set forth.

Figure 1:
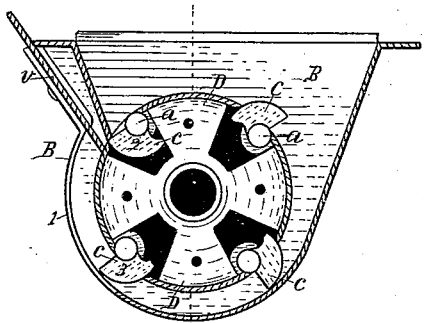
Figure 2:
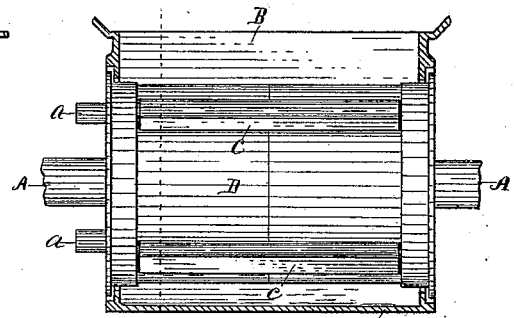
Figure 3:
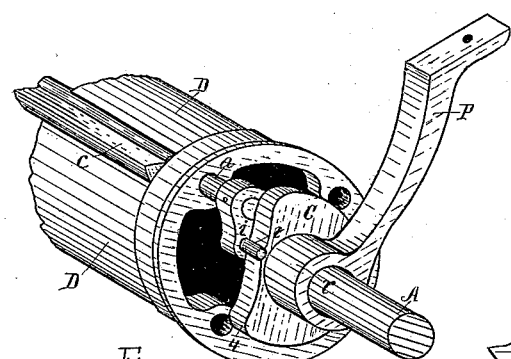
Figure 5:
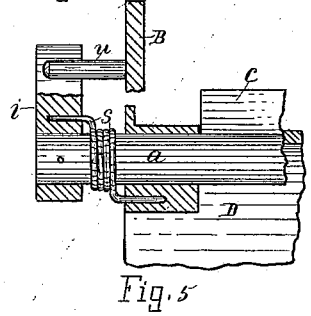
Figure 6:
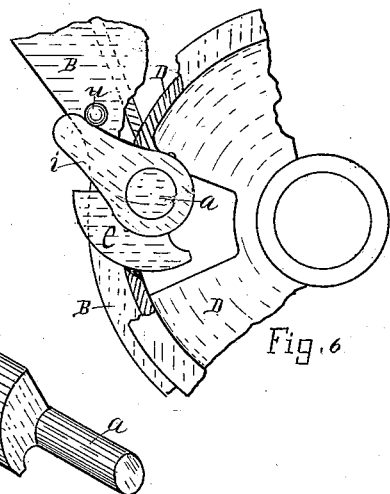
Figure 4:
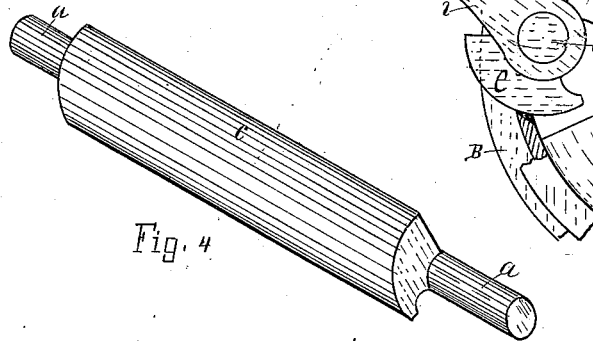
Figure 7:
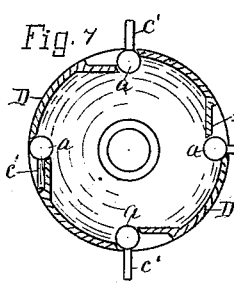

In the drawings forming a part of this specification, Figure 1 is a vertical section on the dotted line in Fig. 2; Fig. 2, a vertical section on the dotted line in Fig. 1; Fig. 3, a lettered detail in perspective; Fig. 4, an enlarged perspective of one of the wings; Fig. 5, a view showing changes in construction, looking from a point at left of Fig. 6, parts being in section; Fig. 6, a view looking from a point at left of Fig. 5, also showing broken details from Fig. 1, enlarged; and Fig. 7 shows lettered details from Fig. 1 with changes in construction.

Referring to the lettered parts of the drawings, B is a pocket or cup, which, when in use, is attached to the under side of a grain or fertilizer box and opens at the top into the latter in the ordinary manner. (Said box not shown.) This pocket is circular throughout its lower inclosure and has a delivery-mouth, 1, at one side. (Shown in Fig. 1.) The cylinder D is mounted in said pocket by means of axle A, having revoluble bearings in the end *r* of brackets P. Of course the cylinder has axle-bearings at both ends, only one end being here shown. The bracket P in use is pendant from the machine-frame. (Said frame not shown.) There is a space between the periphery of the cylinder and the lower circular inclosure of the pocket B. The cylinder has a series of recesses in its periphery, (shown in black in Fig. 1,) in which recesses the wings *c* are mounted. These wings have axles *a*. The heads of the cylinder D project out from the periphery of the cylinder, and in said projecting portion the axles *a* of the wings *c* have oscillating bearings, Figs. 3 and 5, so that they may be swung to approximately an angle radiating from the cylinder-axis, and can be swung down within their recesses for the purpose explained further on. These wings may be sectoral or quadrant shape in cross-section. Fig. 4 illustrates about a quadrant in perspective. The wings may be otherwise shaped, one of which appears in Fig. 7 at *c'*.

It will be observed that the wings *c* always keep the mouth of their recesses closed at whatever angle they take when oscillated, thus excluding the fertilizer or grain, as the case may be.

As there are many plans by which to operate the wings and control them, I do not wish to confine my invention to any specific devices or means. Those I have illustrated and below described will serve to illustrate the operation.

The axles *a* at one end have right-angled arms *i*, and in Fig. 3 this arm has a crank-handle, *t*. Rigidly attached to the bracket P, or some other suitable support, is a cam, C, representing in shape of periphery a little more than a half-circle, or a circle with a segment removed. The cylinder-axle A passes loosely through this cam.

In the operation, supposing the pocket B to be filled with grain or fertilizer, and the cylinder to be revolving from left to right, the wings which are at a radial angle push the fertilizer or grain in front of them, carrying it around between the cylinder and circular inclosure of the pocket to the delivery-mouth 1. When the wings are in this position or angle, the handle *t* of the arm *i* traverses the circular portion of the cam C. When said handle leaves this portion of the cam at point 4, Fig. 3, the wing tilts into its recess in the cylinder, and thus dumps its contents out of the mouth 1, Fig. 1. The wing 3 in the latter-named figure is about at the point where this tilting action takes place. The wing remains thus tilted until just beyond the point occupied by the tilted wing 2. While the wing is tilted the handle *t* traverses the straight portion of the cam. This portion in Fig. 3 is not accurately straight, but sufficiently so. By making this portion of the cam a little uneven the wing will slightly oscillate and facilitate the discharge of its contents. When fertilizer which is moist or weighty is being distributed, a scraper, v, may be employed, and as the wing is drawn under its lower end it will be successfully cleaned of particles which may have adhered to it.

If preferred, the crank-handle t may be dispensed with, and a pin, u, can be employed, projecting from the wall of the pocket, to contact with the arm i to tilt the wing, Figs. 5 and 6. In this construction a spring, s, is employed on the axle a, one end of said spring being attached to the cylinder and the other end to the arm. By means of this spring or its equivalent the wing is always held at a radial angle until tilted, as above stated, and it tilts against a spring resistance, so that as soon as the arm i leaves the pin u the wing swings up to its radial angle again.

When the wing passes under the scraper v or the wall of the pocket near said scraper, or both if the scraper is employed, the contact of the wing with said parts would again tilt it against a spring resistance, and for this reason it is obvious that the arm i and the pin u may be dispensed with and still make an operative construction by the employment of the spring s.

In some instances the construction in Fig. 5 is preferable to that in Fig. 3, one of which may be named. In case there were hard substances—nails, stone, or the like—in the material being sown, which should obstruct the passage between the circular wall of the pocket B and the cylinder, the spring would allow the wing to yield when the latter came in contact with it.

In Fig. 7 the wings c' are in the form of a cover. They have the same axles, a, and oscillating bearings as in Fig. 3. The recesses in the cylinder D, in Fig. 7, are closed, so as to exclude the grain or fertilizer, by the axles a and by depressed portion 5 of the periphery of the cylinder. When these wings tilt, they lie in the recess, as at left of Fig. 7. Otherwise the construction is like the other figures.

Having thus described my invention, what I claim is—

1. A cylinder revolubly mounted in a grain or fertilizer pocket, provided with periphery-recesses, and wings in said recesses having oscillating bearings in said cylinder, substantially as set forth.

2. The combination of a pocket having the circular lower inclosure, a cylinder revolubly mounted therein provided with periphery-recesses, wings in said recesses having oscillating bearings, and means for swinging the wings to approximately a radial angle, substantially as set forth.

3. The combination of the pocket, a revoluble cylinder therein provided with periphery-recesses, oscillating wings having axial bearings in the cylinder, the cranks terminating the end of the wing-axles, and a fixed cam having the circular and straight portion, substantially as set forth.

4. The combination of the pocket, a cylinder revoluble therein having periphery-recesses, and wings in said recesses, and springs holding said wings at radial angles and adapting them to tilt against a spring resistance, substantially as set forth.

5. The combination, with the pocket, of a cylinder revolubly mounted therein, wings having oscillating bearings in said cylinder, and means for swinging said wings from a radial angle to the plane of the periphery of the cylinder and from said plane to a radial angle, substantially as set forth.

In testimony of the foregoing I have hereunto subscribed my name in presence of two witnesses.

BENJAMIN F. RIX.

Witnesses:
W. S. WHITEHEAD,
WM. McDONALD.